Figure 1:
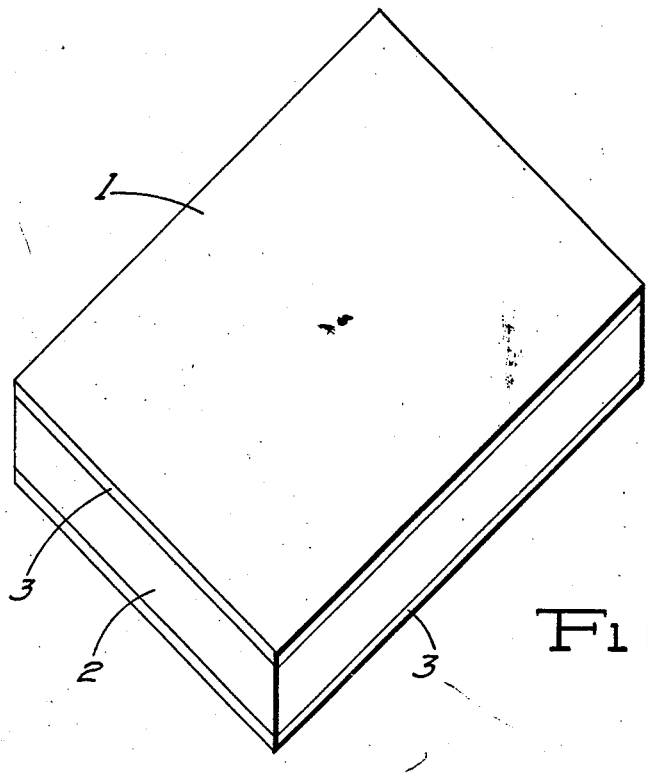

June 3, 1947.   F. W. SMITH ET AL   2,421,721
MOLDED FIBER-CEMENT COMPOSITION PRODUCT
Filed June 13, 1944

INVENTORS.
Fred Wilson Smith.
Harold W. Greider.
Lloyd R. Becker.
BY
Kenyon & Kenyon
ATTORNEYS.

Patented June 3, 1947

2,421,721

UNITED STATES PATENT OFFICE 2,421,721

MOLDED FIBER-CEMENT COMPOSITION PRODUCT

Fred Wilson Smith, Cincinnati, Harold W. Greider, Wyoming, and Lloyd K. Becker, Cincinnati, Ohio, assignors to The Philip Carey Manufacturing Company, a corporation of Ohio Application June 13, 1944, Serial No. 540,010

10 Claims. (Cl. 106—86)

This invention relates to molded composition products and relates particularly to rigid molded composition products of hardened cementitious material.

It is an object of this invention to provide rigid molded composition products which are relatively light in weight and which are of relatively high strength for weight. It is a further object of this invention to provide such products which have good thermal heat insulation properties. It is also an object of this invention to manufacture such products from relatively inexpensive materials and by simple and inexpensive manufacturing procedure. Further objects of the invention relate to formulating and hardening the composition so as to result in a product of the character and having the properties aforesaid which is uniform in consistency and properties throughout and is free from cracks or flaws.

According to this invention products suitable for a variety of purposes can be manufactured. Thus, it is possible according to this invention to produce products in the nature of excellent heat insulation materials that are of the order of density and have strength at least equal to that of the widely used heat insulation material that is referred to in the art as "85% magnesia" insulation. It is also possible in the practice of this invention to produce somewhat denser and stronger composition products which are desirable as structural materials when made in the form of slabs, boards and the like and which are especially suitable for use in integral combination with rigid reinforcing materials such as cement-asbestos lumber, plywood, and the like. For example, the composition products of this invention have excellent characteristics for use as a light weight, strong, heat insulating core of composite building board panels and the like.

Features of this invention relate to the novel combination of bonding ingredients which we have found to possess unusual properties in the formulation of molded cementitious products whereby light weight bodies may be provided that have relatively high strength for their weight. Further features of this invention relate to the steps whereby the molded aqueous mixture of the solid ingredients of the composition is made into a product that is of controlled light weight and that is uniform in properties and composition throughout and is free from cracks and flaws.

Heretofore difficulties have been encountered in the molding of cementitious compositions which, after molding and drying, are intended to be light in weight. One such difficulty is that which is incident to obtaining requisite strength. Any light weight molded product must of necessity comprise a multiplicity of pores and voids which constitute actually the greater part of the volume of the molded object, for otherwise the product would be heavy and dense. When, however, a product is produced that contains a multiplicity of pores and voids the area of binding contact of the particles in the mass is greatly reduced. The result is that most products which are molded to light weight are deficient in strength and are readily crumbled. When attempt is made to increase the strength as by the employment of various cementing materials, increasing the pressure under which the mass is molded, and the like, the resulting product tends to become excessively heavy and dense.

Another difficulty that has been encountered in the molding of light weight cementitious compositions is syneresis, namely, the tendency for the liquid to exude or otherwise segregate from the solids in the molded mass so that it shrinks and becomes non-uniform in consistency. The result is that during the molding operation the liquid in the cementitious mass tends to bleed from the mold and likewise rises to the surface while the solid constituents tend to settle and become distributed non-uniformly throughout the mass. When this occurs part of the mass becomes excessively dense and heavy while the mass in other parts is excessively porous and fragile, and the molded mass is unsuitable not only for these reasons, but also because the mass as a whole becomes very much reduced in strength.

Another difficulty that has been encountered in any process wherein the mass is hardened under superatmospheric temperature and pressure, as in an atmosphere of steam under elevated pressure in an autoclave, is the tendency of the mass to develop internal cracks or flaws due to the disrupting tendency induced by the elevated temperature and pressure.

According to this invention difficulties of the character aforesaid have been overcome utilizing conventional and low cost materials and economical manufacturing procedure.

According to this invention a plurality of bonding ingredients are employed in combination, the bonding ingredients being in combination the product of reaction between hydrated lime and silica, Portland cement, reinforcing asbestos fibers, and montmorillonitic type clay. These materials in themselves have the property of forming a tough, strong and rigid cementitious material that is bulky and light in weight. The combination of the lime-silica binder with the Portland cement affords considerably stronger binding action than either of these materials when used alone. In addition, the Portland cement in combination with the montmorillonitic type clay have a special function in the successful formation of the hardened cementitious mass, in that they afford an initial hardening of the mass prior to subjecting the mass to an atmosphere of steam under high temperature and pressure for the purpose of developing the lime-silica binder in the mass by reaction between the hydrated lime and silica components. By causing the mass to attain an initial hardening due to the action of the Portland cement and the montmorillonitic type clay, the mass retains its integrity better during the autoclaving with the result that development of cracks and flaws or other disruption of the mass during autoclaving is essentially eliminated. The montmorillonitic type clay likewise has a further highly important function in that it imparts to the mass at the time of molding such high consistency and water retaining properties that the mass remains essentially homogeneous during molding and setting and difficulties due to syneresis can be essentially eliminated. As a result of the employment of the montmorillonitic type clay the mass as molded and set is essentially uniform in composition and properties throughout. Moreover, the ultimate strength characteristics of the molded product are improved. The reinforcing asbestos fiber has a double role in the bonding composition. In the first place the fibers, being of substantial length, become anchored in the hardened composition and contribute to its strength and toughness. In the second place, the fibers tend to form an open skeletal structure in the mass and prevent the ingredients of the mass from becoming associated together in an undesirable dense condition.

The above described bonding combination is of such high strength and lightness, that if desired, finely divided filler materials may be combined therewith. Preferably any filler material is employed in relatively low proportions, namely about 25% or less, and preferably about 15% or less, of the total solid materials, since any filler tends to fill the pores and voids in the mass making it undesirably dense. Especially in the case of heat insulations, it is desirable to use little or no filler. Preferably any filler that is employed is a low bulk density filler so that any increase in density due to the presence of the filler is minimized as much as possible.

Having thus indicated in a general way the nature of the molded cementitious composition of the products of this invention, the different elements thereof will now be defined and described more in detail. The part of the composition that has been referred to hereinabove as "lime-silica binder," is the product of reaction between hydrated lime and silica. It has previously been known that hydrated lime and silica can be caused to react with each other if subjected to high pressure in an atmosphere of steam to form a cementitious binder, the invention herein described being a special combination of this type of binder with other bonding ingredients to afford the special advantages and improvements of this invention.

Hydrated lime and silica react in about equivalent molecular quantities to produce a cementitious reaction product. Consequently, it is normally desirable to employ hydrated lime and silica in about equivalent proportions by weight. Ordinary hydrated lime contains about 85% by weight of chemically reactive and available $Ca(OH)_2$, although it tends to deteriorate gradually due to absorption of $CO_2$ from the air upon standing. It is ordinarily desirable to employ hydrated lime which contains at least 80% and preferably at least 90% by weight of chemically reactive $Ca(OH)_2$. When such is the case, by using the hydrated lime and silica in about equal proportions by weight the lime will react with substantially all of the silica and there will be little in the way of unreacted lime or of unreacted silica remaining in the final product.

It is not essential that the hydrated lime and the silica be present in substantially equal proportions by weight, for any excess of one or the other of these substances will remain in the composition as a diluent filler. However, any unreacted lime or unreacted silica (unless the silica is of the character of diatomaceous earth) is of a heavy and dense character and is much less desirable than the low bulk density fillers that are described hereinbelow as permissible for inclusion in relatively small amounts in the molded composition products of this invention, which are designed to be of light weight. The reaction product that is developed by causing lime and silica to react is referred to herein and in the claims for the sake of brevity as "lime-silica binder" and this lime-silica binder is an important ingredient of the binder in the finished product, and any excess of either unreacted silica or unreacted lime is not regarded as part of the lime-silica binder.

The silica that is employed for entering into the lime-silica reaction should be a type of silica that is pulverulent and provides a very high area of surface for reaction with the hydrated lime. For the production of the normally desired light weight products of this invention, diatomaceous earth should be used as the silica, since this material in itself is of low bulk density and tends to form the lime-silica binder in a distributed open condition that is light in weight as well as a good binder. Silica flour will also react with the hydrated lime, that type which passes a 200 mesh testing sieve, and which preferably passes a 325 mesh testing sieve, being especially suitable, but such silica flour tends to result in products of considerably greater density than the products produced using diatomaceous earth. Consequently, it is normally desirable that at least about 90% of the silica consists of diatomaceous earth and preferably all of the silica consists of diatomaceous earth, especially in connection with products of the heat insulation class having a density of the order of 10 to 18 lb. per cubic foot.

The Portland cement that is employed may be the ordinary type Portland cement, but we have found that very substantial improvements are afforded by employing the type of cement which is known as "high early strength Portland cement." High early strength Portland cement consists predominantly of tricalcium silicate whereas the ordinary Portland cement consists predominantly of the dicalcium silicate. High early strength Portland cement is generally made by the double burning of Portland cement clinker and is ground somewhat finer than the standard grades of Portland cement, and in 24 hours hardens to an extent to afford strength that is comparable to the strength attained by ordinary Portland cement in 28 days. One well known high early strength Portland cement is that which is sold under the name "Incor" by the Lone Star Cement Company. We have found that the high early strength Portland cement is of advantage in the practice of this invention, not only because of its rapid hardening and curing properties, but also because of its peculiar and special effectiveness in combination with the other bonding materials in the combination for affording high strength in combination with lightness in weight. Therefore, in the practice of this invention, it is preferable that all of the Portland cement be of the high early strength type or at least that such cement be in major proportion of the cement used in the composition.

The asbestos fiber that is employed as part of the special bonding combination is that which is of the grade or classification containing a substantial proportion of fibers that are somewhat longer than the asbestos fibers commonly employed for manufacturing asbestos paper. The most widely recognized classification of asbestos fiber is that promulgated by the Quebec Asbestos Producers' Association in their publications. In the mining and milling of asbestos fibers, the fibers are separated roughly into gradings or classifications according to their length. The longest grading of fibers, including fibers an inch or more in length, are generally referred to as spinning fibers and are relatively costly. The fibers of the order of length of $\frac{1}{16}$ inch to $\frac{3}{8}$ inch are widely employed in the manufacture of asbestos paper. Such fibers used in paper making fall for the most part in those classifications or groups of the Quebec Asbestos Producers' Association bearing the numbers 5, 6 and 7. In addition, there is produced during the milling of asbestos a considerable amount of dust, most of which has heretofore had no commercial value and has therefore been discarded in dumps. This dust is of appreciable fiber length, although very short and fine, and the bulk of it will pass a 14 mesh testing sieve although much of it, and usually about 50% by weight of it, will be retained on a 200 mesh testing sieve.

The asbestos fiber that is employed in the bonding combination is intermediate between the spinning grades and the paper making grades of asbestos fiber. Generally speaking, these fibers fall in those general classifications or groups of the Quebec Asbestos Producers' Association which are designated as No. 3 and No. 4 or are longer. However, employment of fibers falling in the No. 5 general classification is permissible provided a major proportion of the fibers is of the order of length of the fibers in the No. 3 and No. 4 classifications or is longer. Preferably a major proportion of the fiber is of the order of length of the No. 3 classification or longer especially in connection with the manufacture of products of the heat insulation type as will be pointed out more in detail below and should constitute at least about 10% by weight of the total solid materials. The general classifications numbered 3, 4 and 5, as well as the other classifications of the Quebec Asbestos Producers' Association, are divided into sub-classifications, but the fibers of the general classifications or groups indicated have been found by us to be suitable and are referred to herein as "reinforcing asbestos fiber." Further in connection with these classifications it may be mentioned that, in the milling of asbestos, the separation of the different asbestos gradings or classifications is never clean cut and that any grading or classification includes fibers of varying lengths including some fines, but the gradings or classifications are in any case characterized by fibers of the general order of length for which the particular grading or classification is suitable and must conform to the screening requirements prescribed by the classification system of the Quebec Asbestos Producers' Association. When reference is made herein or in the claims to a particular classification of asbestos fibers, the reference is to the classification system of the Quebec Asbestos Producers' Association.

The type of asbestos fiber that is employed may advantageously be the common chrysotile asbestos fiber, although any other asbestiform mineral fibers, such as amosite, or the like, which are of the length range above indicated may be employed and such fibers are referred to generally herein as asbestos.

The montmorillonitic type clay is that type of clay which comprises the mineral montmorillonite and which has the property of swelling when mixed with water and of forming when employed in relatively minor amounts in water a highly viscous suspension of semi-gel consistency. One such clay which has these properties is bentonite clay, bentonite clay being typical of the type of clay which is used in the bonding combination according to this invention and which is generally referred to herein as montmorillonitic type clay. Such clays, due to their swelling tendency, are somewhat difficult to mix with water and for this reason it is normally preferable to employ a small amount of an agent, of which several are well known, such as alum or reactive oxides such as magnesium oxide, that is effective in facilitating the dispersion of the montmorillonitic type clay in water.

We have found that particularly advantageous properties of combined strength and low density are obtainable when the ingredients of the bonding combination are employed within certain limits of relative proportion. Generally speaking, for products of a range of density from about 10 to 33 lb. per cubic foot the weight ratio of the lime-silica binder to the Portland cement may be varied between about 1:1 and about 6:1, although it is preferable that this ratio be maintained between about 2:1 and about 5:1. For most purposes the optimum ratio is approximately 4:1. The ratio of the combined weight of the lime-silica binder plus the Portland cement, to the weight of the reinforcing asbestos fiber may be varied between about 0.5:1 and about 8:1, it being preferable to maintain this ratio between about 1:1 and about 4:1, the optimum ratio for most purposes being about 2:1. The montmorillonitic type clay in general may be varied from about 2% to about 25% by weight of the solids in the composition. However, we have found that for composition products of the order of density from about 18 to 33 lb. per cubic foot it is desirable, in order to prevent the product from becoming excessively dense, to use somewhat less than 25% by weight of the montmorillonitic type clay. Accordingly for products that have preferred low density in combination with high strength, it is desirable that the maximum amount of the montmorillonitic type clay vary from about 25% to about 15% by weight of the total solids, and still better from 18% to about 8% by weight of the total solids, in inverse proportion for densities ranging from 10 to 33 lb. per cubic foot.

As mentioned above, some filler materials which are finely-divided, solid, water-insoluble and heat-resistant may be combined with the ingredients of the special bonding combination, but for low density products such filler should be a low bulk density filler. By heat resistant it is intended that the filler should not disintegrate excessively when subjected to temperatures of the order of 1000° F. or lower. The filler likewise should remain as such and should not be reactive to prevent the formation of the lime-silica binder or prevent the normal setting of the cement, and any filler that is referred to herein or in the claims is to be understood as being of this character.

The bulk density of a finely-divided filler can readily be determined for the purpose herein considered by the following standard test procedure. The filler is first sifted through an 8 inch diameter standard testing sieve having sieve openings somewhat larger than the largest size particles of the sample being tested, to break up any lumps or large agglomerates of particles. 40 grams of the sifted filler are carefully poured into a 250 cc. graduated cylinder which is inclined at about a 45° angle, the internal diameter of the cylinder being 1.23 inches, the graduations extending 13.65 inches up from the bottom, and the cylinder being provided with a cork base. The cylinder is then repeatedly dropped through one inch, there being 50 drops during a period of 100 seconds. From the resulting compacted volume of the filler in the graduate, the bulk density of the filler in grams per cubic centimeter can be computed. Any filler having a bulk density of about .5 gram per cubic centimeter or lower is regarded herein and in the claims as low bulk density filler. Generally the bulk density of a useful filler does not fall below about .25 gram per cubic centimeter.

One low bulk density filler that we have found to have especially valuable properties in the manufacture of molded composition products according to this invention is the whiting that results as a by-product or residue in the manufacture of basic magnesium carbonate from dolomite by the well-known Pattinson process. According to the Pattinson process, the dolomite, which consists essentially of calcium and magnesium carbonate in about equal molecular proportions, is calcined to form dolomitic lime. The lime is then hydrated and formed into a dilute suspension of calcium and magnesium hydroxides which is subjected to carbon dioxide gas under pressure. The magnesium hydroxide is converted into magnesium bicarbonate which is relatively unstable and exists only in dissolved form and only in very dilute solutions, namely, solutions of the order of 3% concentration or less. The extreme state of dilution required for forming the dissolved magnesium bicarbonate results in the fact that the whiting, which is simultaneously formed, is formed by carbonation of calcium hydroxide that is contained in a very dilute suspension. In the Pattinson process, the magnesium bicarbonate solution is separated from the whiting by filtration or decantation or both and is thereafter converted to basic magnesium carbonate by rapidly heating the dilute magnesium bicarbonate solution.

The residual whiting that is produced from dolomite by the Pattinson process is referred to herein and in the claims, for the sake of brevity, as "magnesia process whiting residue." Such whiting is a highly desirable low bulk density filler due to its low bulk density of the order of .30 to .33 gram per cubic centimeter and due to the fact that it is resistant to heat up to temperatures of about 1000° F., has good thermal insulating properties, and is chemically inert except to acids. In addition to magnesia process whiting residue any other low bulk density whiting may be employed. In this connection it may be mentioned, however, that most of the ordinary types of whiting such as naturally occurring calcium carbonate, the whiting that is produced as a by-product of water-softening processes, the whiting that is produced as a by-product of the Solvay soda process, the whiting that is produced from the splitting of fats in soap manufacture, etc., are relatively much heavier than the low bulk density whiting above described.

In addition to low bulk density whiting other low bulk density fillers may be employed. As typical of such low bulk density fillers mention may be made of substances such as diatomaceous earth (in excess of that required to react with the lime), finely-divided clays, pyrophyllite talc, fibrous talc (such as that commonly sold under the name "Asbestine"), dead burned calcium sulphate, and the like. The asbestos dust above mentioned is likewise suitable as a low bulk density filler and contributes to the shock-resistance and toughness of hardened cementitious compositions.

Referring generally to the molded composition products of this invention, the amount of filler that is employed should be relatively low if the combination of high strength and low density is to be attained and should be less than 25% by weight of the total solid materials. Moreover, we have found that in order to obtain the desired low density for products of the low densities suitable for heat insulations the total amount of filler should be still lower and that the maximum amount of filler should vary proportionally from about 10% to about 25% by weight of the total solid materials for densities ranging from 10 to 33 lb. per cubic foot. It is still better when the maximum amount of filler varies proportionally from about 5% to about 15% by weight of the total solids for densities ranging from 10 to 33 lb. per cubic foot.

In general the composition products of this invention are produced by molding in a mold of desired configuration to make the desired shape which may be a flat or curved slab or any other shape as may be desired. The mortar is first made up, the ingredients being mixed in any desired order, although it is usually more convenient to mix the montmorillonitic type clay with the water as an initial separate operation before mixing the water with the other ingredients. We have found that the density of the molded product can be controlled by the water content of the mortar mix. By utilizing a high water content, low densities are afforded. The water content may be varied from about 63% to about 88% by weight of the aqueous mortar mix depending upon the density to be obtained in the finished product.

The mortar mix, after it has been reduced to a uniform smooth consistency is merely poured into a mold and is permitted to take its initial set and no pressure need be applied. The set mass is then air cured at ordinary atmospheric pressure for at least about 2 hours. During this period the cement hydrates and begins to set and in combination with the montmorillonitic clay functions as a binder for the mass, and while the ultimate strength due to the setting action is attained only in a relatively small degree, the molded shape is caused to be of such integrity that when it is thereafter subjected to high steam pressure which tends to disrupt the formed material, the development of cracks and flaws is satisfactorily overcome. When the molded shape has been air cured, as stated, it is placed in an autoclave or other similar equipment so as to subject the material to an atmosphere of steam at a pressure of about 100 to 150 lbs. per sq. inch so as to cause the reaction of the lime and silica to take place with development of the lime-silica binder. This usually takes about 4 hours, or longer if desired. It is desirable to bring the molded shape gradually up to the steam temperature employed, keep the steam pressure constant throughout the steam curing period at the specified steam pressure, and then reduce the steam pressure gradually. When high early strength Portland cement is employed in the composition it becomes substantially completely indurated during the steam curing treatment. When ordinary Portland cement is employed it is usually desirable to prolong the steam curing treatment so as to cause it to become as highly indurated as possible before the molded shape is removed from the autoclave. After the steam curing step has been completed the molded shape is then dried, and in order to accelerate drying the drying should be carried out at a temperature above 212° F., e. g., at a temperature of the order of 250 to 260° F. It is desirable to reduce the product to a completely dried condition in order to develop its maximum strength. The dried product can be used as molded, or may be trimmed, planed, smoothed as by sanding, or otherwise treated to adapt it for particular commercial purposes and applications.

This invention may be further described in connection with certain typical illustrations and applications thereof. Compositions having a density of the order of about 10 to 18 lbs. per cubic foot and having a modulus of rupture ranging from about 50 to 250 lbs. per sq. inch can be readily manufactured according to this invention which have thermal insulation efficiency comparable to that of conventional 85% magnesia heat insulation material, but resistant to considerably higher temperature. 85% magnesia heat insulation is not suited for use at temperatures higher than about 550° F. due to the fact that the basic magnesium carbonate of which it is largely made is decomposed at higher temperatures. The heat insulation material of this invention can withstand temperatures as high as of the order of 1000° F. Preferably for products of this type the density is maintained between about 12 to 15 lbs. per cubic foot and the modulus of rupture is of the order of 100 to 140 lbs. per sq. inch. Products in this range have a density of the same order as 85% magnesia heat insulation, but are roughly twice as strong. Moreover, the product of this invention can be produced at a considerably lower cost as compared with 85% magnesia heat insulation. Heat insulation material produced according to this invention has extremely high resistance to the disintegrating action of water.

The following is a typical example of a heat insulation embodying this invention:

| | Per cent |
|---|---|
| Asbestos fiber of 3Z classification | 29 |
| Hydrated lime | 23.5 |
| Diatomaceous earth | 23.5 |
| High early strength Portland cement | 12 |
| Bentonite clay | 11.75 |
| Alum | .25 |

The foregoing solid ingredients were made up into a mortar mix containing 83% by weight of water which was molded. The molded material was air cured for 2 hours, steam cured for 6 hours at a steam pressure of 125 lbs. per sq. inch, and dried at 260° F. for 24 hours. The resulting product had a density of 13.5 lbs. per cubic foot and a modulus of rupture of 125 lbs. per sq. inch.

In the manufacture of products according to this invention which are in the low density class of the range of 10 to 18 lbs. per cubic foot, the weight ratio of lime-silica binder to the cement should be between about 2.5:1 and about 5.5 to 1 and preferably is between about 3:1 and about 5:1, with the optimum as illustrated in the foregoing example, namely, approximately 4:1. The ratio of combined weight of the lime-silica binder plus the cement to the weight of the reinforcing asbestos should be between about 0.5:1 and about 4:1 and preferably is between about 1:1 and about 3:1, the optimum being as given in the foregoing example, namely, about 2:1. In such products, the montmorillonitic clay may constitute from about 3% to about 25% by weight of the total solid material, but preferably is maintained between about 6% and about 18% by weight of the solid materials, the best results usually being obtained when the amount of the clay is approximately 12%.

It is desirable in the formation of the compositions of the heat insulation type that the reinforcing asbestos fiber be of the relatively long type. Fibers of the No. 3 classification or longer are the most suitable for this type of product since the shorter fibers afford somewhat greater density and usually of less strength. Thus when fibers shorter than the No. 3 classification fibers are used in a composition such as that of the foregoing example, the density instead of being of the range 10 to 14 lbs. per cubic foot will be of the order of 14 to 18 lbs. per cubic foot. It is apparent, therefore, that while shorter fibers such as those corresponding to the No. 4 classification may be used, it is desirable to employ a major proportion and preferably at least about 75% of asbestos fibers that fall within the No. 3 classification or are longer and that such asbestos fibers of the No. 3 classification or longer should constitute at least about 10% by weight of the total solid materials in the composition. It has previously been mentioned that in products of this low density range it is desirable to limit diluent fillers and the like to a minimum, although, at some sacrifice in density requirements, 10% or less and preferably 5% or less by weight of the total solids may be filler, which should be a low bulk density filler for affording a light weight product.

In the manufacture of molded composition products of the heat insulation class ranging from 10 to 18 lbs. per cubic foot, we have found that products of desired density are obtained when the water content of the molded aqueous mortar is of the range 73% to 88% by weight, and that preferred products are obtained when the water content is of the range 80% to 85% by weight of the mortar mixture.

The molded composition material of this invention may likewise be illustrated in connection with structural materials which are suitable for the manufacture of boards and panels which are heat-resistant and moisture-resistant and that combine lightness in weight with relatively high strength and that at the same time have marked thermal insulation and sound insulation properties. Such products range in density from about 18 to 33 lb. per cubic foot and preferably weigh about 20 to 25 lb. per cubic foot. In the broader density range the modulus of rupture will range from about 150 to 450 lb. per sq. inch, although the modulus of rupture of this type of product in the preferred density range will usually be of the order of 200 to 350 lb. per sq. inch.

The following is a typical example of the type of product above referred to:

|  | Per cent |
|---|---|
| Reinforcing asbestos fiber 3Z classification | 16 |
| Reinforcing asbestos fiber 5R classification | 11 |
| Hydrated lime | 22 |
| Diatomaceous earth | 22 |
| High early strength Portland cement | 11 |
| Bentonite clay | 6.87 |
| Magnesia process whiting residue | 11 |
| Alum | .13 |

The foregoing materials were made into a mortar containing 67.5% of water and the mortar was cast into slabs. The slabs were air cured for 2 hours, steam cured at a pressure of 125 lb. per sq. inch for 4 hours, and dried at about 260° F. for 24 hours. The resulting product had a density of 21 lb. per cubic foot and a modulus of rupture of 245 lb. per sq. inch.

In the manufacture of composition products of the character of panel boards and the like, the weight ratio of the lime-silica binder to the cement should be between about 1:1 and about 6:1, and preferably is between about 2:1 and about 4.5:1, the ratio that is best for most purposes being approximately 4:1. The ratio of the combined weight of the lime-silica binder plus the cement to the weight of the reinforcing asbestos fiber should be between about 0.8:1 and about 8:1, and preferably is between about 1.7:1 and about 4:1, the ratio that is best for most purposes being approximately 2:1. In compositions of this character, the montmorillonitic type clay tends to increase the density of the product quite rapidly when it is present in amounts over 10% by weight of the total solid materials and for this reason the amount of montmorillonitic type clay is desirably between about 2% and about 10% and preferably is of the order of about 3.5% to about 8% by weight of the total solid materials, the amount of montmorillonitic type clay that is best for most purposes being approximately 7%.

Products of the density range of 18 to 33 lb. per cubic foot are not adversely affected by relatively small amounts of filler, when the filler is a filler of low bulk density. Thus, in the case of magnesia process whiting residue, such filler can be employed in amounts ranging from about 0% to about 11% by weight of the total solid materials without materially affecting the density or strength of the product. Since such whiting is a waste product that is ordinarily discarded on the dump, its material cost is virtually nothing and it therefore is desirable to include such diluent filler in the formulation of the product. While it is preferable to employ the magnesia process whiting residue or other low bulk density whiting as the diluent filler, other low bulk density fillers may also be employed. More generally in products of this class the amount of low bulk density filler should desirably be kept below 25% by weight of the total solid materials and preferably should be less than 15% by weight of the total solid materials in the product.

The reinforcing asbestos fiber that is employed in products of the class having a density of about 18 to 33 lb. per cubic foot desirably includes fiber falling in the No. 3 classification or longer that constitutes at least about 10% by weight of the total solids and that preferably constitutes at least about 15% by weight of the total solids in the composition. It is also preferable to combine with fibers of the No. 3 classification some shorter fibers in either the No. 4 or No. 5 classifications since we have found that in compositions of this particular type improved strength is afforded by fibers of graded lengths in the reinforcing fiber range.

In the manufacture of molded composition products of the density range from 18 to 33 lb. per cubic foot, we have found that products of desired density are obtained when the water content of the molded aqueous mortar is of the range 60% to 75% by weight, and that preferred products are obtained when the water content is of the range 63% to 71% by weight.

Figure 2:
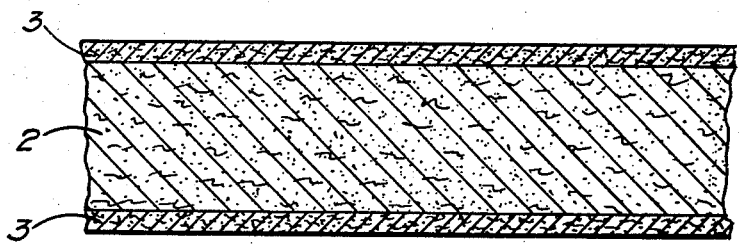

One application for which molded composition products embodying this invention are especially suitable when the density is of the range 18 to 33 lb. per cubic foot, is the fabrication of composite boards. The molded composition product of this invention is especially suitable for use in combination with rigid strong surfacings such as cement-asbestos boards and serves as a heat-insulating and sound insulating backing or core. A product of this character is shown in the accompanying drawings wherein:

Fig. 1 is a perspective view of a composite structural board embodying this invention; and Fig. 2 is an enlarged side sectional elevation of a portion of the structural board shown in Fig. 1.

The structural board shown in the drawings is indicated generally by the reference character 1 and comprises the core member 2 and the surfacing layers 3. The core member may, for example, be formulated according to the foregoing example. The surfacing layers 3 may, for example, be cement-asbestos boards. In such a product the surfacings 3 are preferably strong and rigid and can be finished and surface ornamented in any suitable way. For example, cement-asbestos board may be employed as one of the layers 3 which is finished appropriately for an exterior surface, while the other layer may be finished appropriately for an interior surface. If the core 2 is, for example, about 2 inches in thickness, the resulting wall panel will be comparable in thermal insulating effectiveness with ordinary insulated building walls. It is seen, therefore, that such panels can be employed as the board material for the walls and roof slabs of prefabricated buildings and the like. They are also suitable for this purpose since they are light in weight for their strength and can be readily installed. Such panel board is likewise non-combustible and is heat-resistant and moisture-resistant.

By using the molded composition product of this invention in the manufacture of a composite board which has rigid surfacing layers, the composite product has been found to have a very high degree of strength and load carrying capacity which we believe is due in large part to the great rigidity of the hardened cementitious composition of this invention. Due to the rigidity of the product of this invention, there is a cooperative action with the rigid surfacing layers which results in very high strength and load carrying properties as compared with a product wherein the insulating core material has some flexibility, as is the case with ordinary fiber insulation boards.

The surfacing that may be employed with molded composition products according to this invention may be of any suitable character such as fiber board, plywood, metal, gypsum boards or the like, as may be desired. Such surfacings may be united with the composition product of this invention as by a suitable adhesive such as a silicate adhesive that preferably includes an insolubilizing agent for the silicate such as Portland cement or may be secured thereto mechanically. Such surfacing may be on either one or on both sides of the special molded composition and may be the same or different on the opposite surfaces.

It is apparent from the foregoing that according to this invention molded composition products are afforded which are heat resistant and moisture resistant, which have good thermal and sound insulating properties, and which are notable for their low ratio of density to strength. In the practice of this invention one can readily produce molded products which vary from about 10 to about 33 lbs. per cubic foot and have a minimum modulus of rupture ranging proportionally from about 50 to about 150 lbs. per sq. inch, and in preferred practice the minimum modulus of rupture will range proportionally from about 100 to 250 lbs. per sq. inch. Products having these desirable characteristics and properties can be produced at a considerably lower cost as compared with products previously produced for similar purposes while at the same time affording decided improvements thereon.

While this invention has been described in connection with certain typical examples of the practice thereof it is to be understood that this has been done merely for illustrative purposes and that the practice of this invention may be varied within the scope thereof as defined in the following claims.

We claim:

1. A molded composition product of hardened cementitious material having a density of the order of 10 to 33 lbs. per cubic foot and having a minimum modulus of rupture that varies proportionally between about 50 and about 150 lbs. per sq. inch for densities between 10 and 33 lbs. per cubic foot and characterized by its being formed of water-insoluble and heat-resistant solid materials consisting essentially of the following combination of bonding ingredients constituting from about 75% to 100% by weight of said solid materials and low bulk density filler constituting from about 25% to 0% by weight of said solid materials with the maximum content of said low bulk density filler ranging proportionally from about 10% to about 25% by weight of said solid materials for densities of the product ranging from 10 to 33, and said bonding ingredients comprising in combination lime-silica binder, Portland cement, reinforcing asbestos fiber, and montmorillonitic type clay, the weight ratio of the lime-silica binder to said cement being between about 1:1 and about 6:1, the weight ratio of the combined lime-silica binder and cement to said reinforcing asbestos fiber being between about 0.5:1 and about 8:1, the reinforcing asbestos fiber containing a minimum amount of asbestos fiber of the No. 3 classification or longer that is at least 10% by weight of the total solid materials, and the montmorillonitic type clay being present in an amount ranging from a minimum of about 2% to a maximum that varies from about 25% to about 10% by weight of the total solids in inverse proportion for densities ranging from 10 to 33 lbs. per cubic foot of the product.

2. A molded composition product according to claim 1 wherein said low bulk density filler consists in major proportion of magnesia process whiting residue.

3. A molded composition according to claim 1 wherein the major proportion by weight of the Portland cement is high early strength Portland cement.

4. A heat insulation product of hardened cementitious material having a density of the order of 10 to 18 lbs. per cubic foot and having a modulus of rupture of the order of 50 to 250 lbs. per sq. inch and characterized by being formed of water-insoluble and heat-resistant solid materials consisting essentially of the following combination of bonding ingredients constituting from about 90% to 100% by weight of said solid materials and low bulk density filler constituting from about 10% to 0% by weight of said solid materials, said bonding ingredients being in combination lime-silica binder, Portland cement, reinforcing asbestos fiber, and montmorillonitic type clay, the weight ratio of said lime-silica binder to said cement being between about 2.5:1 and about 6.5:1, the weight ratio of the combined lime-silica binder plus cement to said reinforcing asbestos fiber being between about 0.5:1 and about 4:1, said reinforcing asbestos fiber comprising asbestos fiber corresponding to the No. 3 classification or longer, in an amount that constitutes at least about 10% by weight of the total solids, and the montmorillonitic type clay constituting from about 3% to about 25% by weight of said solid materials.

5. A heat insulation product of hardened cementitious material having a density of the order of 12 to 15 lb. per cubic foot and having a modulus of rupture of the order of 100 to 140 lb. per sq. inch and consisting essentially of the following combination of bonding ingredients constituting from about 95% to 100% of the cementitious material and water-insoluble, heat-resistant low bulk density filler constituting from about 5% to about 0% by weight of said cementitious material, said bonding ingredients being in combination lime-silica binder, high early strength Portland cement, reinforcing asbestos fiber and montmorillonitic type clay, the weight ratio of said lime-silica binder to said cement being between about 3:1 and about 5:1, the weight ratio of the combined lime-silica binder plus the cement to said reinforcing asbestos fiber being between about 1:1 and about 3:1, at least about 75% by weight of the reinforcing asbestos fiber being of the order of the No. 3 classification or longer, and the montmorillonitic type clay constituting from about 6% to about 18% by weight of the cementitious material.

6. A molded composition structural material of hardened cementitious material having a density of the order of 18 to 33 lb. per cubic foot and having a modulus of rupture of the order of 150 to 450 lb. per square inch and characterized by its being formed of water-insoluble and heat-resistant solid materials consisting essentially of the following combination of bonding ingredients constituting from about 75% to 100% by weight of said solid materials and low bulk density filler constituting from about 25% to 0% by weight of said solid materials, said bonding ingredients comprising in combination lime-silica binder, Portland cement, reinforcing asbestos fiber, and montmorillonitic type clay, the weight ratio of said lime-silica binder to said cement being between about 1:1 and about 6:1, the weight ratio of the combined lime-silica binder plus the cement to said reinforcing asbestos fiber being between about 0.8:1 and about 8:1, and said montmorillonitic type clay constituting about 2% to about 10% by weight of said solid materials.

7. A molded composition structural material according to claim 6 wherein a major proportion by weight of said Portland cement is high early strength Portland cement.

8. A molded composition structural material according to claim 6 wherein part of the reinforcing asbestos fiber is in the No. 3 classification and part of the reinforcing asbestos fiber is within the range of the No. 4 and No. 5 classification.

9. A molded composition structural material according to claim 6 in slab form in combination with a rigid surfacing layer integrally united thereto.

10. A molded composition structural material of hardened cementitious material having a density of the order of 20 to 25 lb. per cubic foot and having a modulus of rupture of the order of 200 to 350 lb. per square inch and consisting essentially of the following combination of bonding ingredients constituting from about 85% to about 100% by weight of the cementitious material and water-insoluble heat-resistant low bulk density filler constituting from about 15% to 0% by weight of the cementitious material, said bonding ingredients being in combination lime-silica binder, high early strength Portland cement, reinforcing asbestos fiber and montmorillonitic type clay, the weight ratio of the lime-silica binder to said cement being between about 2:1 and about 4.5:1, the weight ratio of the combined lime-silica binder plus the cement to said reinforcing asbestos fiber being between about 1.7:1 and about 4:1, at least 10% by weight of the cementitious material being asbestos fiber of the order of the No. 3 classification or longer, and the montmorillonitic type clay constituting from about 3.5% to about 8% by weight of the cementitious material.

FRED WILSON SMITH.
HAROLD W. GREIDER.
LLOYD K. BECKER.

REFERENCES CITED

The following references are of record in the file of this patent:

UNITED STATES PATENTS

| Number | Name | Date |
|---|---|---|
| 873,849 | Duerr | Dec. 17, 1907 |
| 1,045,933 | Belknap | Dec. 3, 1912 |
| 1,932,971 | Huttemann et al. | Oct. 31, 1933 |
| 2,235,176 | Schless | Mar. 18, 1941 |
| 2,084,354 | Morbelli | June 22, 1937 |
| 1,314,772 | Viens | Sept. 2, 1919 |
| 1,421,751 | Wright et al. | July 4, 1922 |
| 1,968,489 | Jenkins | July 31, 1934 |

FOREIGN PATENTS

| Number | Country | Date |
|---|---|---|
| 4,632 | Great Britain | 1894 |
| 497,136 | Great Britain | 1938 |